March 31, 1953 E. P. G. WRIGHT 2,633,499

TELECOMMUNICATION SWITCHING SYSTEM

Filed Aug. 6, 1947 8 Sheets-Sheet 1

INVENTOR.
ESMOND PHILIP GOODWIN WRIGHT
BY
Robert Harding Jr.
ATTORNEY

March 31, 1953 E. P. G. WRIGHT 2,633,499

TELECOMMUNICATION SWITCHING SYSTEM

Filed Aug. 6, 1947 8 Sheets-Sheet 2

INVENTOR.
ESMOND PHILIP GOODWIN WRIGHT
BY
Robert Harding Jr.
ATTORNEY

March 31, 1953 E. P. G. WRIGHT 2,633,499

TELECOMMUNICATION SWITCHING SYSTEM

Filed Aug. 6, 1947 8 Sheets-Sheet 3

INVENTOR.
ESMOND PHILIP GOODWIN WRIGHT
BY
Robert Harding Jr.
ATTORNEY

March 31, 1953 E. P. G. WRIGHT 2,633,499

TELECOMMUNICATION SWITCHING SYSTEM

Filed Aug. 6, 1947 8 Sheets-Sheet 4

INVENTOR.
ESMOND PHILIP GOODWIN WRIGHT
BY
Robert Harding Jr.
ATTORNEY

March 31, 1953 E. P. G. WRIGHT 2,633,499

TELECOMMUNICATION SWITCHING SYSTEM

Filed Aug. 6, 1947 8 Sheets-Sheet 5

INVENTOR.
ESMOND PHILIP GOODWIN WRIGHT
BY
Robert Harding Jr.
ATTORNEY

INVENTOR.
ESMOND PHILIP GOODWIN WRIGHT
BY
Robert Harding Jr.
ATTORNEY

March 31, 1953 E. P. G. WRIGHT 2,633,499

TELECOMMUNICATION SWITCHING SYSTEM

Filed Aug. 6, 1947 8 Sheets-Sheet 7

INVENTOR.
ESMOND PHILIP GOODWIN WRIGHT
BY
Robert Harding Jr.
ATTORNEY

INVENTOR.
ESMOND PHILIP GOODWIN WRIGHT
BY
Robert Harding Jr.
ATTORNEY

Patented Mar. 31, 1953

2,633,499

UNITED STATES PATENT OFFICE 2,633,499

TELECOMMUNICATION SWITCHING SYSTEM

Esmond Philip Goodwin Wright, London, England, assignor to International Standard Electric Corporation, New York, N. Y., a corporation of Delaware Application August 6, 1947, Serial No. 766,634
In Great Britain April 3, 1947

5 Claims. (Cl. 179—27)

This invention relates to telecommunication switching system in which connections can be set up between calling and called parties by the aid of an operator.

The object of the invention is to give improved supervision of connections between parties and their establishment.

The main feature of the invention comprises a telecommunication exchange system comprising an operator's position, means for recording automatically particulars of a connection set up with the aid of an operator and display means associated with the operator's position for indicating particulars of a connection to an operator under control of the automatic recording means.

My copending divisional application Serial No. 766,635, filed August 6, 1947, and entitled "Cordless Switchboard for Telecommunication Exchanges," contains claims directed to the switchboard arrangement hereinafter disclosed.

The invention will be clearly understood from the following description of one embodiment shown in the accompanying drawings in which Fig. 1 is a schematic of connecting circuits and associated operators' circuits at an international telephone exchange.

Fig. 9 shows number indicating equipment at the operator's position and means in SG, Fig. 1 for controlling the setting of the number indicating equipment, while

Figure 1:
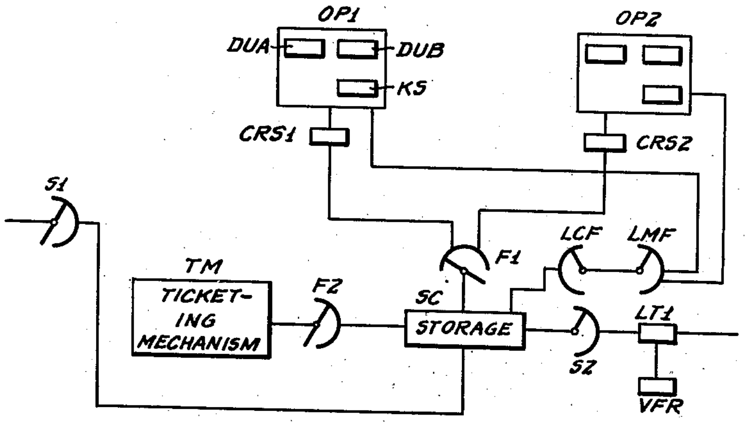

For long distance connections the use of special manual positions are often found to be necessary in order to provide the most appropriate facilities for the long distance operator to carry out the necessary operations with the least delay.

It has long been the practice for the long distance operator to write on a ticket the details of each call.

This procedure has been valuable both for the calculation of the fee to be charged and the posting of the charge against the subscriber's account. In addition the ticket has provided a useful means for storing the information when a call is delayed on account of congestion.

On the other hand, the use of such tickets involves a considerable amount of clerical labour and tends to slow up the essential work of the long distance operator.

It is known to provide means for automatically recording the information regarding a connection which an operator would normally write on a ticket, but the provision of such means in semi-automatic working would leave the operator without any record of the particulars of the connection.

It is now proposed to give an operator an indication of particulars of a connection such as the numbers of the called and calling parties to a connection and of the number of digits of a called party's number which have been transmitted over a long-distance line in setting up a connection.

Other information such as the chargeable time which has elapsed could also be indicated to the operator.

According to normal practice a long distance operator's position will not be restricted to a single call and once the operator is satisfied that the calling party has been correctly connected she is free to undertake the establishment of a second connection. It should be understood therefore that the operator has the possibility of disassociating her telephone set from a connection which she has set up, and that she can also disassociate her indicating apparatus in preparation for the handling of a subsequent connection. Means may also be provided whereby the relevant indications of a previous connection can be again displayed if the operator wishes to have access to this information.

In certain long distance calls and more particularly on international calls a degree of complexity in the operating is introduced by language differences. Generally speaking international calls rely on one or other of a few languages which are understood by most international operators, but if international calls are established on a semi-automatic basis the answer may be expressed in many languages or dialects and for this reason it is desirable that the originating operator should have facilities for obtaining assistance rapidly either from another operator in the same exchange or from an operator at the distant end of the connection.

It is proposed that by means of a simple key operation it will be possible for any operator to invite the assistance of a second operator in the same line of switchboards indicating at the same time the language in which assistance was required. If such an operator accepts the invitation her position will become coupled with the connection and the indications of the call will become displayed on the relief operator's position so that she is in a condition to take over the supervision of the call from the operator who originally set up the call. If and when this condition is determined upon materially the former operator can withdraw and disassociate her position from the connection.

This transfer feature may also be valuable for other purposes such as the handling of delay traffic on cordless type switchboards.

If congestion on a particular route is experienced it is probable that the most efficient method of clearing off the overload is to allocate one or several operators to the available circuits and in this way to arrange that the circuits are used for a succession of calls so long as the congestion occurs. When a call for a delayed route is received by an ordinary line operator she can record the call order, check the calling subscribing number and transfer the call order to a delay position or a clerical position where the details are recorded and passed to the appropriate delay operator in chronological order.

Fig. 1 shows in schematic form the arrangement of a semiautomatic long distance switchboard in which S1 represents a selector through which subscribers obtain access to the recording positions such as OP1 and OP2.

SG represents a storage group and F1 a finder switch. Each new call is extended to the appropriate or free position by means of a storage group SG and a finder such as F1 giving access to all positions.

The operator's position includes two display units DUA and DUB which can be used to indicate the identity of the calling and called number. In addition the positions each contain a key set KS and a code relay set or code responder CRS in addition to other apparatus not shown. When the operator receives the number required she records this information by means of KS into CRS which transfers this information on a code basis into a series of storage units in SG.

SG acts as a register sender transmitting the called subscriber's identity into DUB and to a long distance selector S2 through this selector to subsequent switching stages.

The identity of the calling subscriber may be transmitted from automatic line identification equipment to suitable storage units in SG or it may be obtained verbally by the operator and transmitted through KS and CRS into SG. On the completion of the connection the ticket machine and calculator TM becomes associated with the storage group SG by means of the finder F2 and the details of the call are finally recorded in known manner.

In the event of transfer being needed the finder F1 will be associated with the helping position OP2 and the stored information will be again transferred into DUA and DUB of OP2 as before.

The function of SG in sending the numerical information forward will be similar to a conventional register or code sender. The digital sequence will be controlled by a series of relays or by a distributor switch and the same control is used to indicate the progress of digit transmission to the operator.

Figure 2:
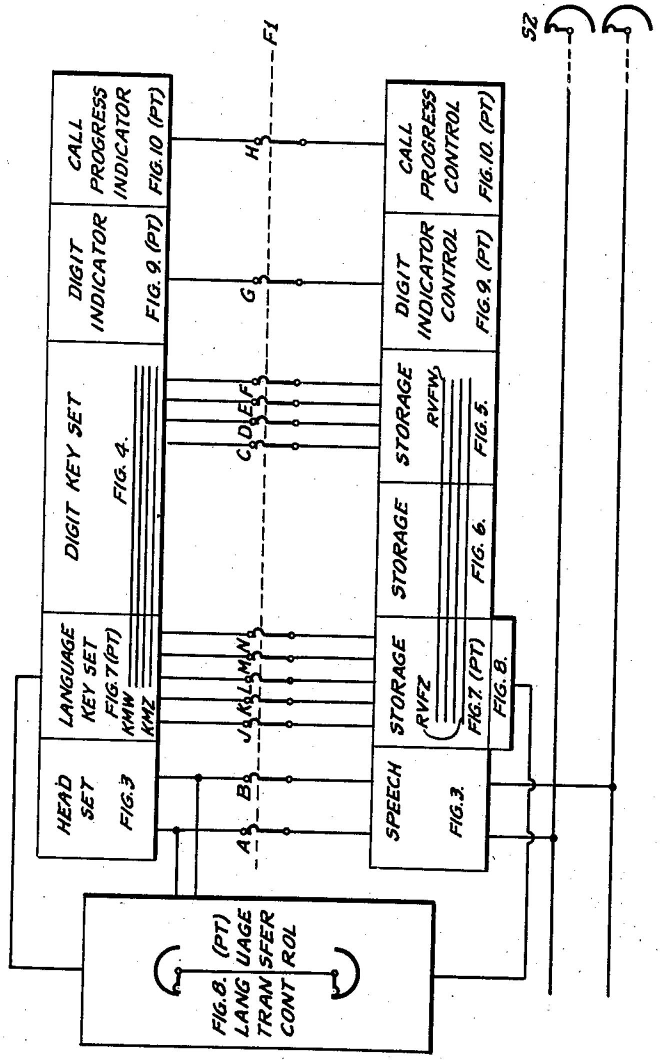
Fig. 2 shows the relation to one another of the detailed circuits shown in Figs. 3–10 and the use made of switch F1 for connecting together these figures or different parts thereof, all of which with the exception of Fig. 8 form part of either or both of the circuits OP and SG, Fig. 1.

Fig. 2 shows the manner in which Figs. 4–10 are related to each other and to the component parts of Fig. 1. Part of Fig. 3, Fig. 4, and parts of Figs. 7, 9 and 10 constitute the relevant portions of an operator's position circuit, OP1, Fig. 1. Different wipers of switch F1, Fig. 1, are shown in Figs. 3, 4, 7, 9 and 10, while Figs. 5 and 6, and parts of Figs. 3, 7, 9 and 10 constitute the relevant portions of storage circuit SG, Fig. 1.

Figure 3:
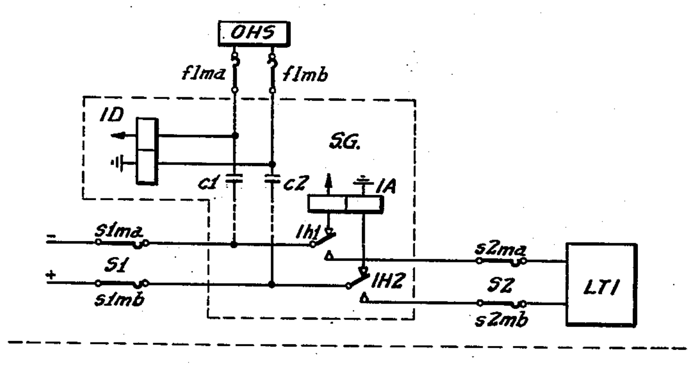
Fig. 3 shows a talking connection circuit in SG associated via switch F1 with operator's cordless positions OP1, OP2.
Figure 6:
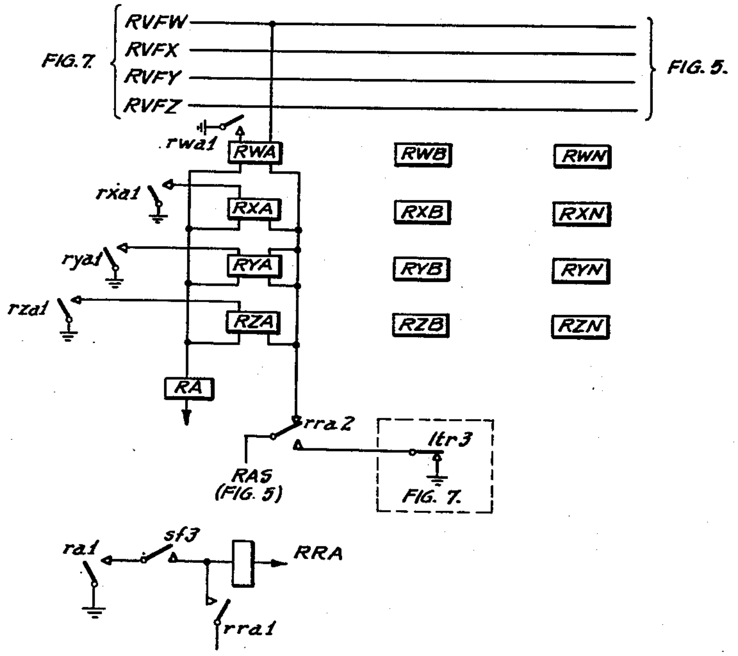
Fig. 6 shows calling number storage equipment forming part of SG, Fig. 1.

Fig. 3 shows the essence of the speaking circuit. The selector S1 is positioned by conventional means to choose a suitable free outlet. The *−ve* and *+ve* wipers choose a suitable free outlet. The *−ve* and *+ve* wipers *s1ma*, *s1mb* are extended to relay 1A in the storage group SG.

The finder F1 searches for a free operator's position as described later with reference to Fig. 8.

The operation of the test relay will complete the speech leads to the wipers *f1ma*, *f1mb* in conventional manner and speech current will be fed to the operator's head set OHS through relay 1D. Suitable condensers C1, C2 will be placed between 1A and 1D to maintain independent direct current supervision. When the call is extended by the operator the selector S2 will be operated by conventional means to choose a suitable line termination LT1 and a relay 1H (not shown) will be operated in conventional manner to operate switching contacts *1h1*, *1h2* to disconnect relay 1A and extend the connection to LT1 which may be a four-wire terminal equipment.

Figure 4:
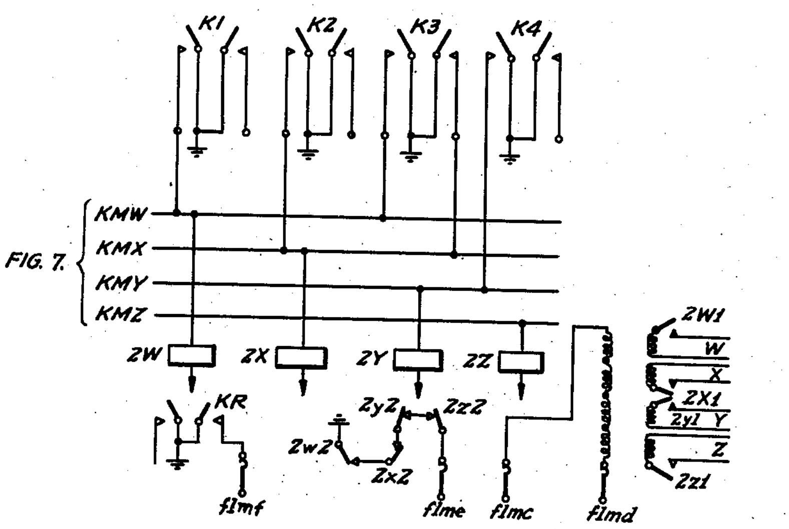
Fig. 4 shows an operator's digit key set and associated equipment for transmitting digits on a V. F. (voice frequency) code basis.

Fig. 4 shows the operator's key-set KS containing push keys K1, K2, K3 and K4 arranged to operate via leads KMW—KMZ in combination the relays 2W, 2X, 2Y and 2Z, which constitute CRS, Fig. 1 and which are arranged to connect a source of four frequencies W, X, Y and Z to the wipers *f1mc*, *f1md* by means of contacts *2w1*, *2x1*, *2y1* and *2z1*. The contacts *2w2*, *2x2*, *2y2* and *2z2* are arranged in series to extend a ground via wiper *f1me* to relay SF, Fig. 5 to indicate the restoration of the keys after each digit transmitted, while KR is a change-over key connected via wiper *f1mf* to relay SC, Fig. 5.

Figure 5:
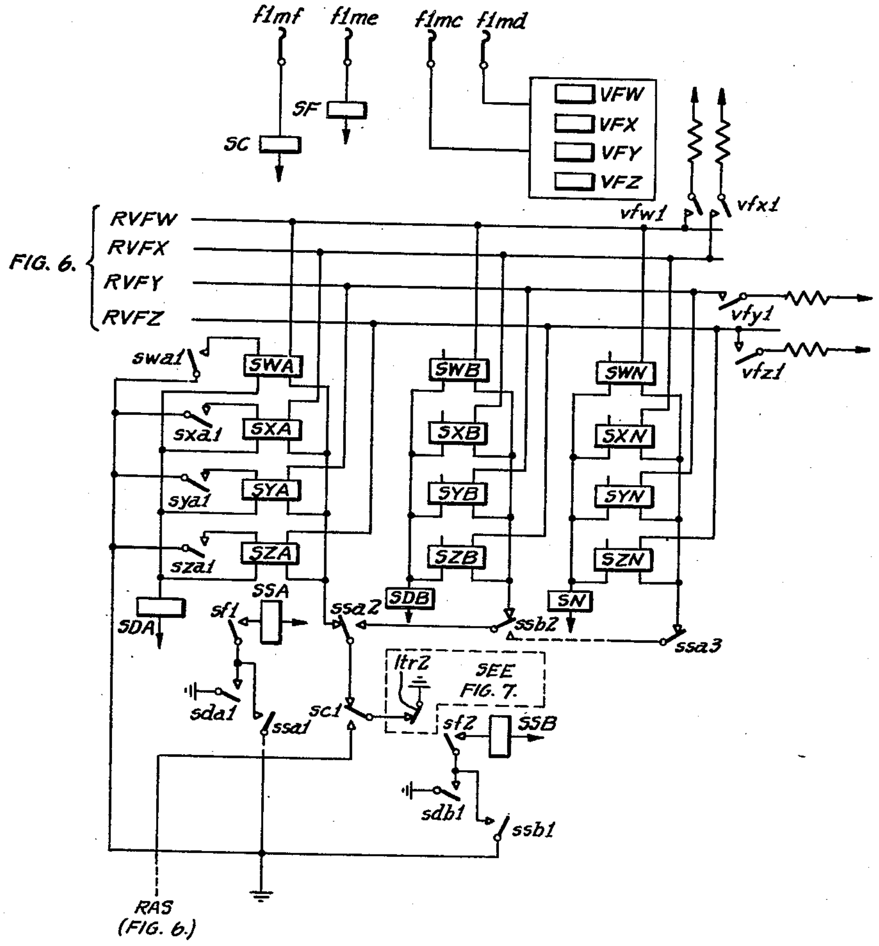
Fig. 5 shows called-number storage equipment forming part of SG, Fig. 1.

Fig. 5 illustrates a part of the storage group SG accessible from Fig. 4. It contains a voice frequency register of any conventional design including four frequency discriminating relays VFW, VFX, VFY and VFZ. The operation of a combination of these four relays causes the operation of the corresponding relays of a group of four storage relays SWA, SXA, SYA and SZA via leads RVFW—RVFZ. The operating circuit can be traced from battery and potential resistance contacts *vfw1*, *vfx1*, *vfy1* or *vfz1*, one right-hand winding of one or more of the relays SWA, SXA, SYA and SZA, contacts *ssa2*, and *sc1* to ground.

The combination of relays operated lock through their second left-hand windings over the circuit-battery, relay SDA, windings of relays SWA, SXA, SYA, SZA, contacts *swa1*, *sxa1*, *sya1*, *sza1* to ground.

When the operator releases the key, relay SF operates over wiper *f1me* contacts 2*z*2, 2*y*2, 2*x*2, and 2*w*2 to ground. Relay SSA operates via *sf1* and *sda1*. Contacts *ssa2* open the operating circuit for relays SWA, SXA, SYA and SZA and close the corresponding circuits for relays SWB, SXB, SYB and SZB.

The second operation of the key set therefore operates a combination of these relays which lock to relay SDB. When the relay SF operates on release of the second digit key, a circuit is closed for the relay SSB which introduces the third storage group (not shown) and so on to the *n*th and last storage group shown.

As has already been explained the identity of the calling subscriber may come direct from line identification equipment as described for instance in British Patent No. 440,348, or from the operator. In the latter case the operator will depress key KR Fig. 4, which extends ground over the wiper *f1me* to the relay SC, Fig. 5. Contacts *sc1* disable the storage sets SWA, SXA, SYA, SZA; SWB, SXB, SYB, SZB, etc., and close the corresponding operating sets for the storage sets RWA, RXA, RYA, RZA; RWB, RXB, RYB, RZB, etc., in Fig. 6. The leads RVFX, RVFY, RVFZ, RVFW, RAS extend from Fig. 5 to Fig. 6. The operations for the storage of the calling line number are identical to those described for the called line.

Figure 9:
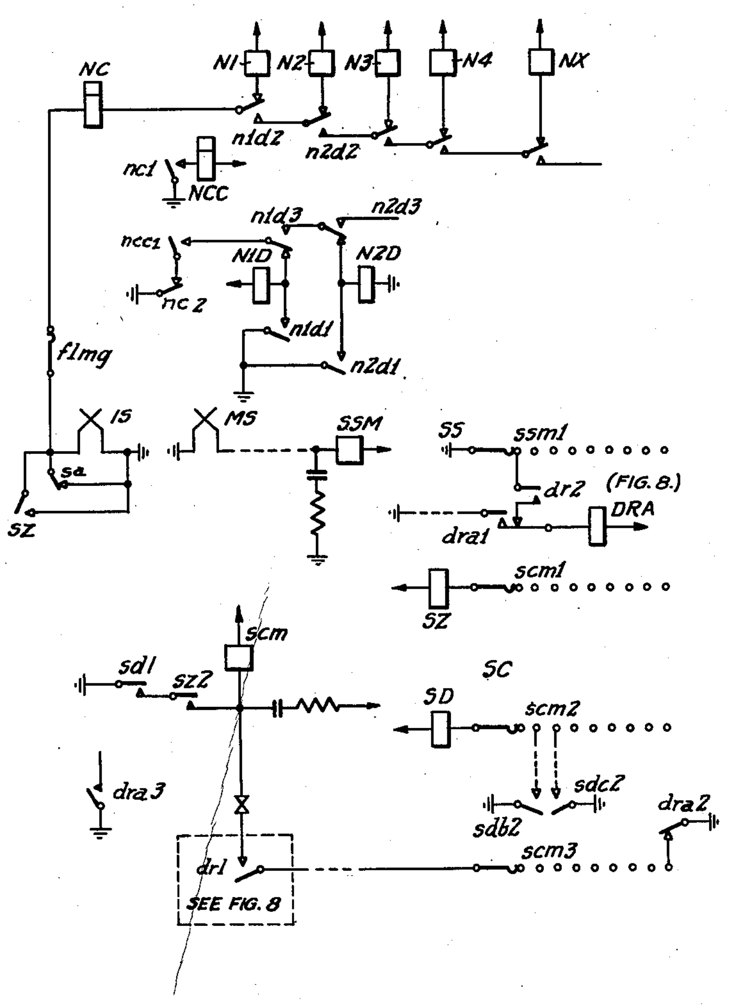

Fig. 9 shows a part of the storage group SG Fig. 1 and a portion of an operator's position OP1 which includes a group of electromagnetically operated digit indicators N1, N2, N3 . . . N*x* of well known type each of which may be stepped round to indicate one of a number of digits.

The information in the storage groups can be transferred to the number indicators by a series of impulses in the same manner as the transmission of impulses from a conventional director or register translator. This arrangement is so well known that only the essentials of the circuit are shown in order to illustrate the setting of the indicators.

Two pairs of interrupter springs IS and MS operating in synchronism enable the impulses sent over the wiper *f1mg* by IS to be counted by the switch SS, in co-operation with springs MS. The springs IS are normally short circuited by contacts indicated at *sa* which are opened when inpulsing is to begin. Relay SZ is used to short-circuit the springs IS. SS is the digit control switch while SC is the sequence control switch. Contacts 1 . . . 10 of wiper *ssm1* correspond to 1 . . . 10 digital impulses. The first *x* contacts of wipers *scm1* correspond to the digits 1 . . . *x* of the called party's number. Each contact 1 . . . *x* of *scm1* is connected to the contacts 1 . . . 10 of wiper *ssm1* by a fan of contacts of the corresponding set of storage relays e. g. SWA, SXA, SYA, SZA, said contacts being arranged in known manner so that whichever digital value is recorded by the storage relays, a connection will be established from the *scm1* bank contact to, and only to, the contact of *ssm1* corresponding to said digital value. Thus when a train of impulses is sent by IS to N1, switch SS steps in synchronism until the number of impulses corresponding to the first digit registered has been sent. At this moment relay SZ will operate via its home contact, the closed storage relay contacts, the marked contact of *ssm1* on which the wiper is standing, to earth.

Contacts *sz1* short-circuit springs IS, while contacts *sz2* prepare a circuit for switch magnet SCM to operate. Switch SS is homed in conventional manner at the end of each digit. If the second digit is stored, relay SDB, Fig. 5 is operated and relay SD energizes via *scm2* completing the circuit for SCM which steps switch SC one step releasing SZ. Succeeding digits are sent out in similar manner, SC being stepped under control of relay contacts *sdc2*, etc.

At the end of each train of impulses, slow release relay NC which operates in the inpulsing circuit, is released. Its slow-release slave relay NCC remains operated for sufficient time to operate relay N1D which locks via *n1d1*, switches the inpulsing circuit from N1 to N2 and switches its own operating circuit to N2D. Relays N2D . . . will operate in turn at the end of successive impulse trains to connect up indicators N3 . . . to receive the corresponding digits.

The transmission of the stored calling line number to the appropriate number indicators is carried out in a similar manner to the transmission of the called number.

Figure 10:
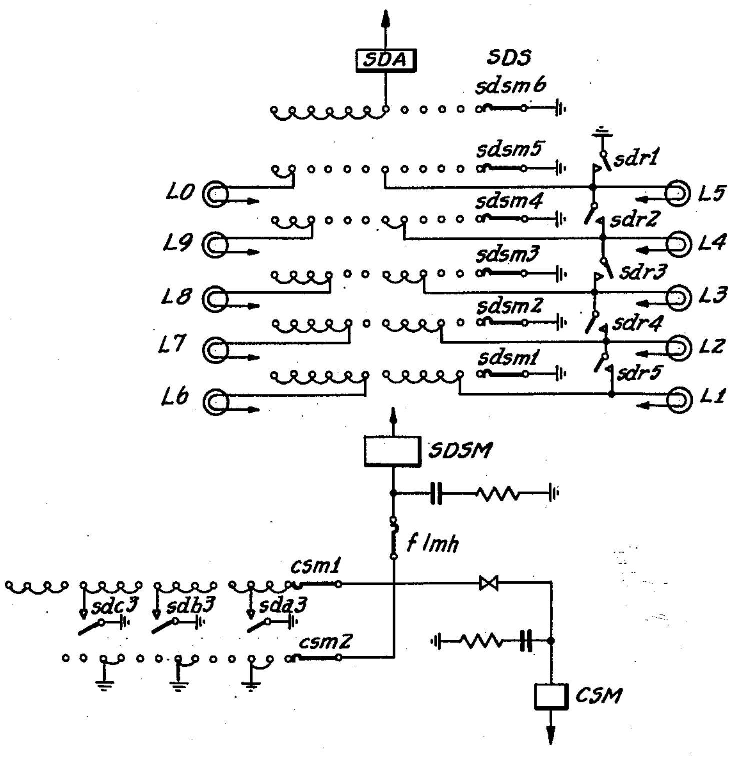
Fig. 10 shows call progress lamp equipment at the operator's position and control equipment therefor in SG, Fig. 1.

The information stored in the storage sets SWA, SXA, SYA, SZA, SWB, SXB, SYB, SZB, etc., can be used for the setting up of the connection in well known manner by the use of the digits so registered for the direct positioning of uni-selectors, or for the choice of the seizing signal transmitted over a long distance connection and for the transmission of the digits in code form as described in application Serial No. 721,892, filed January 14, 1947. The transmission of the digits can be indicated to the operator and a circuit for this purpose is shown in Fig. 10. It is arranged in conventional manner that for each digit transmitted an impulse is passed via the wiper *f1mh* to a switch SDS on the operator's position. As the switch SDS advances it lights a series of lamps L1, L2, L3, L4, L5 by the obvious circuit, all lamps lighted remaining alight. After five steps the relay SDR is operated and its contacts maintain the circuits for lamps L1 . . . L5 so that further operation of the switch can illuminate additional lamps, e. g. L6 . . . L10. If the digits keyed by the operator are translated into a larger number of code digits for transmission over the line then the translating device is arranged to suppress one or more of the groups of grounded contacts on the banks associated with wiper CS2. If on the other hand the translation reduces the number of digits additional grounded contacts would be introduced in the same way. The operation of the lamps L1, L2, L3, etc., indicate to the operator how the transmission of the number called is proceeding.

Figure 7:
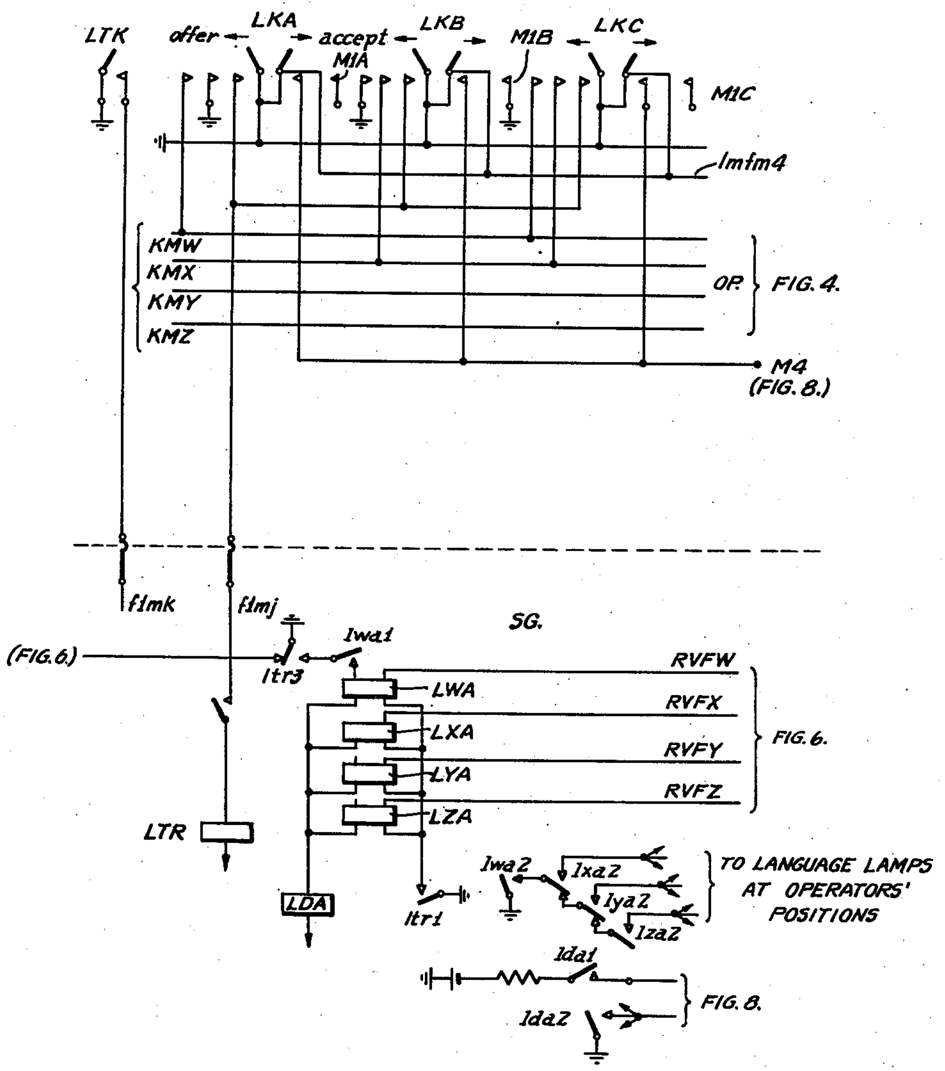
Fig. 7 shows a (language) transfer key set at the operator's position and transfer storage equipment in SG, Fig. 1.

Fig. 7 illustrates the arrangements for preparing the storage group for transfer from one operator to another. LKA, LKB, LKC etc., represent a number of language keys any one of which may be operated to seek the assistance of some other operator on the same or adjacent switchboard. When used for language difficulty each key can be used to represent a different language. The operation of any one of these keys to the left or offering direction causes the operation of relay LTR in the storage group over wiper *f1mj*. The operation of the relay LTR disables the operating windings of the called number storage relay groups Fig. 5 SWA, SXA, SYA, SZA etc., at *ltr2*, and of the calling number storage relay groups Fig. 6 RWA, RXA, RYA, RZA etc., at *ltr3* and at *ltr1* Fig. 7 prepares the circuit for the language storage group LWA, LXA, LYA, LZA etc., via RVFW . . . RVFZ.

These relays are operated from the language keys LKA, LKB, LKC etc., by co-operation with the relays 2W, 2X, 2Y, 2Z in Fig. 4 and the relays VFW, VFX, VFY, VFZ in Fig. 5 in the manner described for digit storage. A selection of the relays LWA, LXA, LYA and LZA characteristic of the language key operated are energised and the contacts *lwa2*, *lxa2*, *lya2*, and *lza2* are shown as a means of operating a multiple of language lamps (not shown) at the operators' positions for language required. There would of course be such a multiple for each language. It is not essential that each operator has an appearance for each multiple as she is enabled to accept one call requiring language assistance by the operation of a key, particular to such language. The relays LWA, LXA, LYA, LZA lock in conjunction with the relay LDA. Contacts *lda1* indicate to the transfer control circuit Fig. 8 that this circuit Fig. 7 has a call to transfer and contacts *lda2* indicate to a common start circuit Fig. 8 that there is a language transfer imminent. It will of course be understood that additional storage groups such as LWA, LXA, LYA, LZA may be provided if more than 15 possibilities are required. Although the description refers to transfer for language difficulty it will be understood that a corresponding operation may be carried out for other purposes such as delay working or concentration of certain types of traffic.

Figure 8:
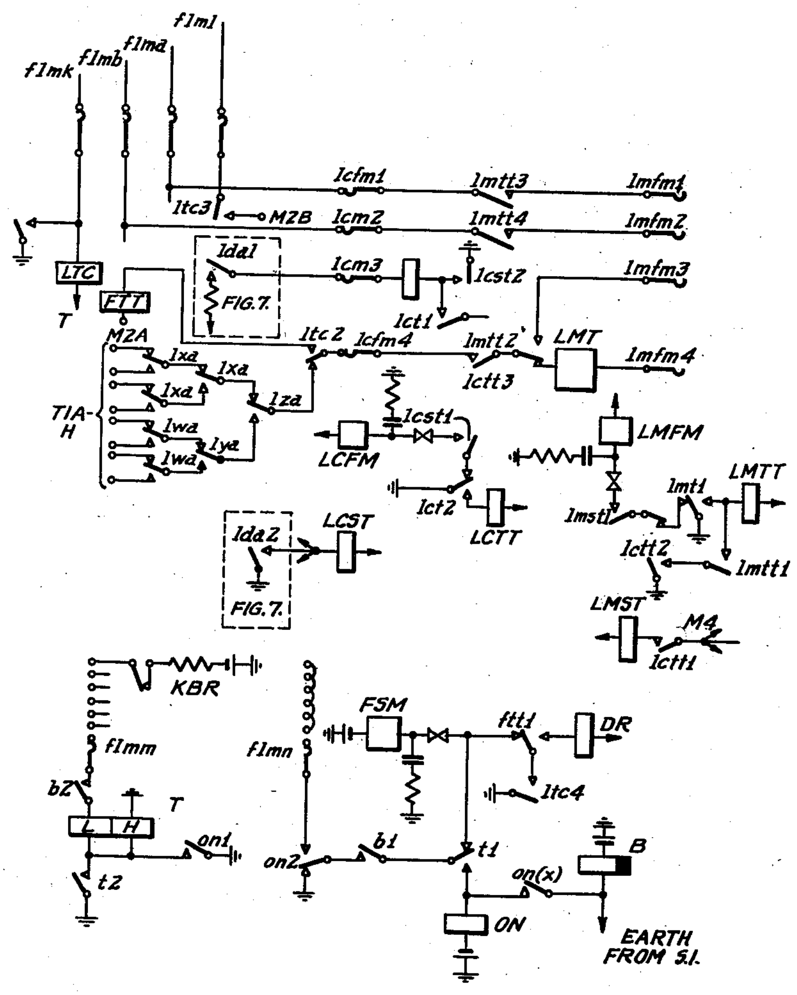
Fig. 8 shows a (language) transfer control circuit associated with Fig. 7.

Fig. 8 illustrates part of the circuit of SG, Fig. 1 and the language control transfer link which comprises the finder LCF which has access to the storage groups SG and the finder LMF which has access to the operators' positions. When an application for transfer is received the operation of the relay LDA Fig. 7, indicates this fact in associated storage group SG. Contacts *lda2* in Fig. 8 extend this condition to the start relay LCST which starts the finder LCF running in search for the storage group marked by a battery potential on the contact of test wiper *lcfm3* provided by the contact *lda1*. The relay LCT finds this condition and opens the stepping circuit of magnet LCEM, and closes an obvious circuit for the relief relay LCTT.

Any operator accepting a language transfer request operates the relevant one of the language keys LKA, LKB, LKC, etc., but in the reverse direction to when offering a call, that is, to the right or "accept" direction.

A ground through any of these keys, Fig. 7, is extended through terminal M4 and the operated contacts of *lctt5* to LMST, and the finder switch LMF steps under control of the test relay LMT. The test circuit is completed from the key contact MIA, MIB, or MIC, through the wiper *lmfm4*, the test device LMT, *lmtt2*, *lctt3*, the mark wiper *lcfm4*, the contact *ltc2*, a combination of the relay contacts LWA, LXA, LYA, LZA particular to the language involved to one of the marking terminals T1A . . . H. Each language can be given a different marking characteristic by a phase difference to an A. C. supply, a different voltage potential, or a different A. C. frequency, etc.

The essential control is provided by the fact that the storage group indicates the language involved, this language is indicated to an operator by a lamp, and she accepts the call by the operation of a key characteristic of the same language.

It will be assumed that multi-potential marking is used, so that contacts MIA, MIB, MIC, Fig. 7 etc., will have different potentials applied thereto, while terminals TIA . . ., Fig. 8, will be connected to the same set of potentials, the same potential being connected to the key contact and the T1 contact characteristic of the same language. The test device LMT will now be a circuit such as that described in U. S. Patent No. 2,354,682 issued August 1, 1944. When wiper *lmfm4* makes connection with the key contact having the same potential as the connected T1 terminal then the test device will operate.

In this condition, both operators can listen in to the connection and if the operator decides to transfer the call to the second operator she operates a general transfer key LTK, Fig. 7, which operates the relay LTC, Fig. 8 via the wiper *f1mk*. The finder F1 now advances from the first operator's position to the second, the magnet FSM being operated as described below. The marking conditions are transferred from a language basis to one which is individual to the storage group.

Each storage group will have two marking terminals M2A, M2B, Fig. 8 connected to the same potential; the potentials will of course differ for each storage group, and the storage group potentials will differ from the language potentials. When switch F1 finds the accepting operator's position, the characteristic marking is extended from M2A through relay FTT, *ltc2*, wiper *lcfm4*, *lmtt2*, wiper *lmfm3* via the accepting operator's position and her contact in the bank of wiper *f1ml* to the marking terminal M2B. Relay FTT operates in the test circuit, the stepping ceases, and the relay DR is operated.

It has been assumed previously that switch F1 has been stepped to a free operator's position. The operation of the switch will now be described with particular relation to its release of the operator's position when the connection has been satisfactorily set up. The finder is initially operated to look for a free operator's position by earth from selector S1 which operates slow-release relay B, Fig. 8. Earth via *on2*, *b1*, *t1* causes magnet FSM to step switch F1 by means of its interrupter springs. A free operator's position is indicated by battery via a key KER (Fig. 8) on the corresponding contact of wiper *f1mm*. When a free position is found relay T operates via its high and low resistance windings H, L in series and holds via its low resistance winding L only to earth on *t2*, the short-circuiting of winding H altering the potential on the *f1mm* contact from the free to the busy condition.

The operation of contacts *t1* opens the finder stepping circuit. Earth via *on2*, *b1*, *t1* operates relay ON which locks via its quick acting contacts *onx* to earth from S1, puts a second earth on the L winding of relay T at *on1* and prepares a homing circuit for finder F1 at *on2*.

When the operator has set up the connection and is satisfied that it is proceeding satisfactorily, she temporarily releases key KBR opening the circuit of relay T which releases. Earth via *on1* still short-circuits winding H of relay T after the relay has released thus preventing T operating during homing.

Magnet FSM is now connected via its interrupter springs *t1*, *b1*, *on2* to the multipled homing bank *f1mn* of finder F1 which runs to its home position and stops. Relays B, ON remain operated until selector S1 releases and removes the earth operating relay B.

Relay DR, Fig. 8, which operates if finder F1 of a storage group transfers from one operator's position to another as described above, acts to cause the indicators of the second operator's position to display particulars of the connection.

Thus referring to Fig. 9 contacts *dr1* complete a circuit from magnet SCM and its interrupter springs to wiper *scm3* and its homing multiple.

Switch SC steps to its home position in which relay DRA energises via change-over contacts *dra1*, closed contacts *dr2*, wiper *ssm1*; locks via *dra1* operated; disconnects the homing earth from the homing multiple of *scm3*; and via *dra3* operates the SA relay (not shown) whose conventional function as previously stated is to remove a normally-operative short-circuit on impulse springs IS and start inpulsing to the indicators N1, N2 etc., under control of switches SS, Sc.

In this way, the called number is set up on the second operator's indicator. In the same way the calling party's number is set up on the indicators.

Similarly the progress of the connection can be indicated to the second operator. Digit sending devices such as register controllers usually comprise a sequence device which changes conditions as each digit is sent e. g. a switch which takes one step for each digit. It would be conventional practice to have a second similar slave switch with contacts of a bank straight multiplied to contacts of a bank of the sequence switch and to arrange that on operation of relay DR the slave switch would step to the position already reached by the sequence switch, an impulse being sent via wiper *f1mh* Fig. 10 to switch magnet SDSM for each step of the slave switch to light a corresponding number of lamps. Further movement of the sequence switch, or the slave switch, as further digits if any are transmitted would cause further impulses to be sent.

I claim:

1. A telecommunication exchange system comprising, in combination, a plurality of toll operators' positions having means thereat for visually displaying the identifying data of a calling line and of a called line between which a connection is to be extended under control of one of said positions, storage means common to said positions, means for automatically extending an incoming call to a free one of said positions, means at said free position for transmitting coded impulses to said storage means to record therein said identifying data of the calling and called lines, and means at said position and under control of said position to cause the transmission of data from said storage means to said visual display means so as to display the said identifying data at any time during the said extension of the connection.

2. A telecommunication exchange system, according to claim 1, in which each of said positions has a key-set and a code responder for enabling the operator to manually record said identifying data in said storage means.

3. A telecommunication exchange system, according to claim 1, in which each of said positions has a transfer key for controlling the transfer of the supervision of the extension of the connection to another operator's position, and means responsive to the operation of said transfer key for automatically operating the visual display means at said other operator's positions to display the digital designations of the calling line and also of the called line under control of said stored record.

4. A telecommunication exchange system, according to claim 1, in which the means for automatically extending an incoming call to a free position comprises an automatic finder switch, and means controlled by said free position for transferring the supervision of the connection to another operator's position while retaining the record in the storage means available to said free position until the said supervision of the connection has been completely transferred.

5. A telecommunication exchange system, according to claim 1, in which at least one digitally-controlled automatic switch is provided for extending the connection towards the called line, and means connected to the storage means for controlling the operation of said switch in accordance with the recorded called line-identifying data stored in said storage means.

ESMOND PHILIP GOODWIN WRIGHT.

REFERENCES CITED

The following references are of record in the file of this patent:

UNITED STATES PATENTS

| Number | Name | Date |
|---|---|---|
| 1,438,743 | Clark | Dec. 12, 1922 |
| 1,509,691 | Richardson | Sept. 23, 1924 |
| 2,161,376 | Moody | June 6, 1939 |
| 2,370,736 | Kittredge | Mar. 6, 1945 |